United States Patent
Shigematsu

(10) Patent No.: US 12,514,601 B2
(45) Date of Patent: Jan. 6, 2026

(54) GUIDE WIRE

(71) Applicant: ASAHI INTECC CO., LTD., Seto (JP)

(72) Inventor: Masaaki Shigematsu, Seto (JP)

(73) Assignee: ASAHI INTECC CO., LTD., Seto (JP)

(*) Notice: Subject to any disclaimer, the term of this patent is extended or adjusted under 35 U.S.C. 154(b) by 84 days.

(21) Appl. No.: 18/632,417

(22) Filed: Apr. 11, 2024

(65) Prior Publication Data

US 2024/0252189 A1     Aug. 1, 2024

Related U.S. Application Data

(63) Continuation of application No. PCT/JP2021/040216, filed on Nov. 1, 2021.

(51) Int. Cl.
  *A61B 17/22*    (2006.01)
  *A61B 17/00*    (2006.01)

(52) U.S. Cl.
  CPC ........ *A61B 17/22* (2013.01); *A61B 17/00234* (2013.01); *A61B 2017/00292* (2013.01); *A61B 2017/00778* (2013.01); *A61B 2017/22044* (2013.01)

(58) Field of Classification Search
  CPC .............. A61B 17/22; A61B 17/00234; A61B 2017/00292; A61B 2017/00778; A61B 2017/22044; A61M 2025/09175; A61M 2025/09083; A61M 2025/09108; A61M 2025/09191; A61M 25/09
  See application file for complete search history.

(56) References Cited

U.S. PATENT DOCUMENTS

| | | | |
|---|---|---|---|
| 2007/0149951 A1* | 6/2007 | Wu ....................... | A61M 25/09 604/526 |
| 2015/0238734 A1 | 8/2015 | Kanazawa | |
| 2018/0015260 A1* | 1/2018 | Sano ..................... | A61M 25/09 |

FOREIGN PATENT DOCUMENTS

| | | |
|---|---|---|
| EP | 2918306 B1 | 11/2020 |
| JP | H09-056822 A | 3/1997 |
| JP | 2013-176488 A | 9/2013 |
| JP | 2015089379 A | 5/2015 |
| JP | 2015-171519 A | 10/2015 |

OTHER PUBLICATIONS

International Search Report and Written Opinion mailed on Dec. 28, 2021, received for PCT Application PCT/JP2021/040216, filed on Nov. 1, 2021, 8 pages including English Translation.

* cited by examiner

*Primary Examiner* — Richard G Louis
(74) *Attorney, Agent, or Firm* — XSENSUS LLP

(57) ABSTRACT

A guide wire includes a core shaft and a cylindrical body that surrounds an outer periphery of a distal end side portion of the core shaft. The cylindrical body includes a first cylindrical portion and a second cylindrical portion located on a proximal end side of the cylindrical body with respect to the first cylindrical portion. A maximum dimension of an outer shape of a transverse section of the second cylindrical portion is larger than a maximum dimension of an outer shape of a transverse section of the first cylindrical portion, and a minimum dimension of the outer shape of the transverse section of the second cylindrical portion is smaller than a minimum dimension of the outer shape of the transverse section of the first cylindrical portion.

20 Claims, 10 Drawing Sheets

GUIDE WIRE

CROSS-REFERENCE TO RELATED APPLICATION

This application is a continuation application of International Application No. PCT/JP2021/040216, filed Nov. 1, 2021. The contents of this application are incorporated herein by reference in their entirety.

TECHNICAL FIELD

The technology disclosed in the present specification relates to a guide wire for guiding a medical device to a target position in a body cavity.

BACKGROUND ART

Using a catheter is widely implemented for treating or examining a constricted part or an occluded part (hereinafter referred to as a "lesion") in a body cavity (blood vessel, etc.). In general, a guide wire is used to guide a catheter to a lesion in a body cavity. The guide wire includes a core shaft and a coil body disposed in such a way as to surround an outer periphery of the core shaft. In a conventional guide wire, a shape of a transverse section of the coil body is the same shape (for example, circular or elliptical shape) over the entire length of the coil body (for example, see Patent Literatures 1 to 3).

CITATION LIST

Patent Literature

Patent Literature 1: JP 2015-171519 A
Patent Literature 2: JP 2013-176488 A
Patent Literature 3: JP H09-56822 A

SUMMARY

Problems to be Solved

The guide wire is required to have a high penetration performance, for example, to reliably penetrate a relatively hard lesion such as a lesion called a chronic total occlusion ("CTO" for short). On the other hand, when the penetration performance of the guide wire is too high, a possibility of erroneously damaging the body cavity wall (blood vessel or the like) increases. Conventionally, no configuration has been proposed for a guide wire that suppresses a decrease in the penetration performance of a guide wire while suppressing damage to a body cavity wall.

Such a problem is not limited to the guide wire in which the coil body is disposed in such a way as to surround the outer periphery of the core shaft, and is a problem common to guide wires in which a cylindrical body (for example, a pipe body in which a slit is formed, etc.) other than the coil body is disposed in such a way as to surround the outer periphery of the core shaft.

The present specification discloses a technique capable of solving at least a part of the problems described above.

Solution to Problem

A guide wire disclosed in the present specification includes: a core shaft; and a cylindrical body disposed in such a way as to surround an outer periphery of a distal end side portion of the core shaft, the cylindrical body including a first cylindrical portion and a second cylindrical portion located on a proximal end side of the cylindrical body with respect to the first cylindrical portion, and a maximum dimension of an outer shape of a transverse section of the second cylindrical portion is larger than a maximum dimension of an outer shape of a transverse section of the first cylindrical portion, and a minimum dimension of an outer shape of a transverse section of the second cylindrical portion is smaller than a minimum dimension of an outer shape of a transverse section of the first cylindrical portion.

The technique disclosed herein can be achieved in various aspects, for example, in an aspect of a guide wire, a method of producing the same, or the like.

DETAILED DESCRIPTION

A. First Embodiment

A-1. Configuration of Guide Wire

Figure 1:
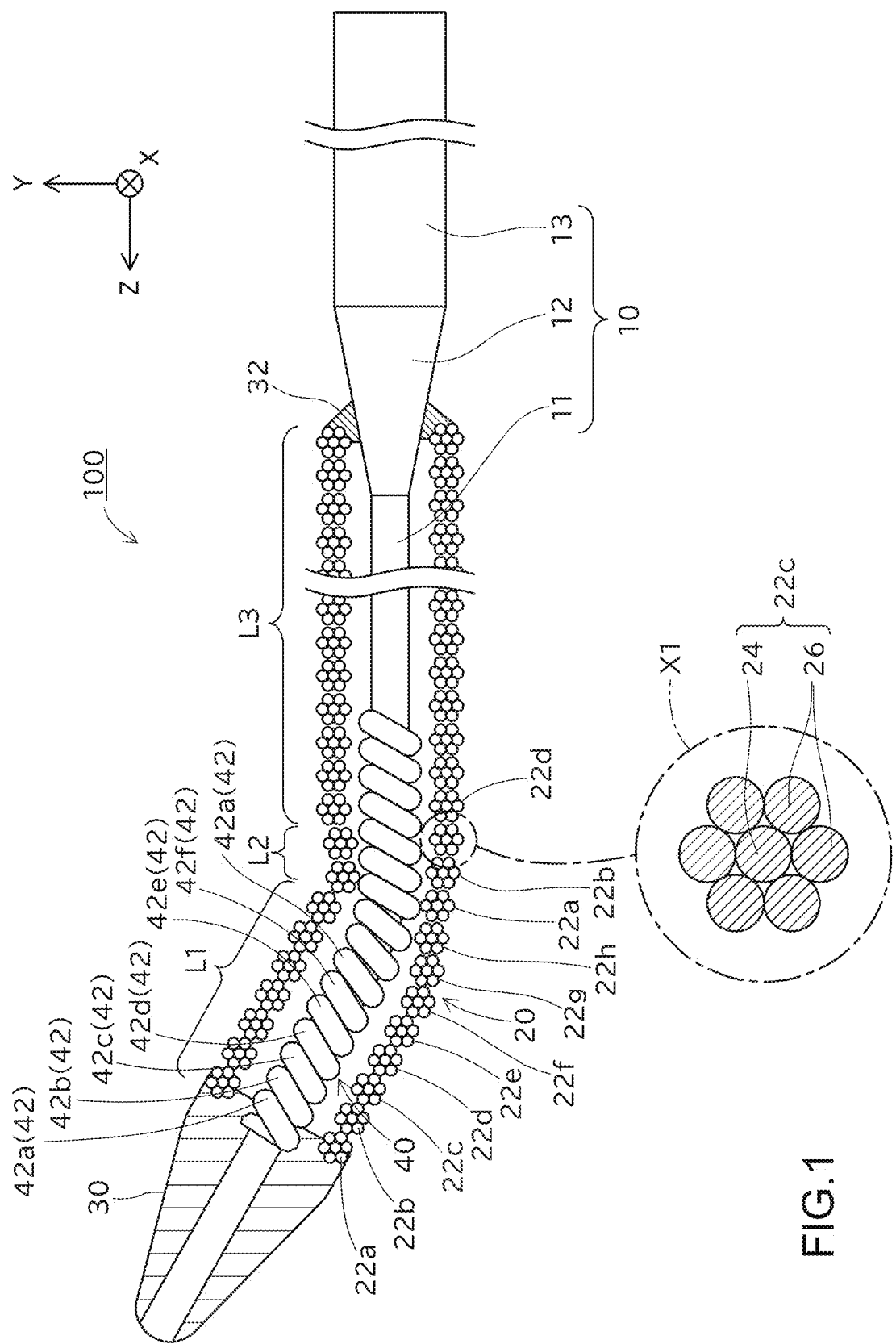
FIG. 1 is an explanatory view schematically illustrating a configuration of a guide wire 100 according to a first embodiment.

FIG. 1 is an explanatory view schematically illustrating a configuration of a guide wire 100 according to a first embodiment. In FIG. 1, XYZ axes orthogonal to each other for specifying a direction are illustrated, an entire configuration of the guide wire 100 as viewed in an X-axis positive direction is illustrated, and a longitudinal sectional configuration of a coil body 20 and a distal end side joint part 30 to be described later is illustrated. The longitudinal section is a section (YZ section in the present embodiment) parallel to the axial direction of the guide wire 100. In FIG. 1, a Z-axis positive direction side is a distal end side (farther side) to be inserted into a body, and a Z-axis negative direction side is a proximal end side (near side) to be operated by a professional such as a physician. As for these points, the same applies to FIG. 2 and following figures. The guide wire 100 has flexibility to the extent that it can be curved. In the guide wire 100 and each component member of the guide wire 100, a portion that includes the distal end and extends toward the proximal end side from the distal end to the middle is hereinafter referred to as a "distal end portion". Similarly, in the guide wire 100 and each component member of the guide wire 100, a portion that includes the proximal end and extends toward the distal end side from the proximal end to the middle is referred to as a "proximal end portion".

The guide wire 100 is a flexible elongated medical device that is inserted into a blood vessel for the purpose of penetrating a relatively hard lesion (for example, CTO) in the blood vessel, for example. The guide wire 100 has a total length of, for example, about 1500 mm or more to 2000 mm or less.

The guide wire 100 includes a core shaft 10, a coil body 20, a distal end side joint part 30, a proximal end side joint part 32, and an inner coil body 40.

The core shaft 10 includes a large diameter portion 13 having a substantially constant outer diameter, a small diameter portion 11 located on the distal end side with respect to the large diameter portion 13 and having a substantially constant outer diameter smaller than the outer diameter of the large diameter portion 13, and a tapered portion 12 located between the large diameter portion 13 and the small diameter portion 11 and having an outer diameter gradually decreasing from the boundary position with the large diameter portion 13 toward the boundary position with the small diameter portion 11. A shape of the transverse section at each position of the core shaft 10 may be any shape but is, for example, a circle shape or flat plate shape. The transverse section is a section orthogonal to an axial direction of the guide wire 100 (in a case where an axis of the guide wire 100 is curved, a section orthogonal to a tangent line with respect to the axis). The outer diameter of the large diameter portion 13 is, for example, about 0.2 mm or more and 0.8 mm or less, and the outer diameter of the small diameter portion 11 is, for example, about 0.05 mm or more and 0.3 mm or less.

As materials forming the core shaft 10, for example, stainless steels (SUS302, SUS304, SUS316, etc.), superelastic alloys such as Ni—Ti alloys, piano wires, and the like are used. The core shaft 10 may be wholly formed of the same material or may be partially formed of materials different from one another.

The coil body 20 has a configuration in which a plurality of (for example, eight) wires are spirally wound. The number of wires of the coil body 20 is one or plural. When the coil body 20 is composed of a plurality of wires, the number of wires can be set to, for example, a number within a range of two to twenty. The coil body 20 is an example of a cylindrical body in the scope of the claims.

As the eight wires included in the coil body 20, twisted wires 22a, 22b, 22c, 22d, 22e, 22f, 22 g, and 22h are used. Among the twisted wires (an example of the wires of the coil body 20) 22a, 22b, 22c, 22d, 22e, 22f, 22g, and 22h, portions adjacent to each other along the longitudinal direction of the coil body 20 are in contact with each other. For example, portions of the twisted wire 22a and portions of the twisted wire 22b adjacent to each other along the longitudinal direction of the coil body 20 are in contact with each other, and similarly, the portions of the twisted wire 22b and portions of the twisted wire 22c, the portions of the twisted wire 22c and portions of the twisted wire 22d, the portions of the twisted wire 22d and portions of the twisted wire 22e, the portions of the twisted wire 22e and portions of the twisted wire 22f, the portions of the twisted wire 22f and portions of the twisted wire 22g, the portions of the twisted wire 22g and portions of the twisted wire 22h, and the portions of the twisted wire 22h and the portions of the twisted wire 22a, which are adjacent to each other along the longitudinal direction of the coil body 20, are in contact with each other. The coil body 20 may have a configuration in which one or a plurality of wires are wound without a gap in the length direction of the coil body 20 (a densely wound configuration).

Each of the twisted wires, for example, the twisted wire 22c has a configuration in which one core wire (solid wire) 24 and six side wires (solid wires) 26 are twisted together. In an area indicated by X1 in FIG. 1, a configuration of a transverse section of a twisted wire to be used as the wire of the coil body 20, for example, the twisted wire 22c is illustrated in an enlarged manner. As the wire of the coil body 20, a solid wire or a twisted wire can be used. When the coil body 20 is formed of a plurality of wires, a solid wire may be used as at least one of the plurality of wires, and twisted wires may be used as the remaining wires.

In FIG. 1, an outer shape of a transverse section of the wire of the coil body 20, for example, the twisted wire 22c, and outer shapes of transverse sections of the core wire 24 and the side wire 26 of the twisted wire 22c are each schematically illustrated as circular shapes. Similarly, in FIGS. 3 to 5, the outer shapes of the wire, the core wire, and the side wire of the coil body 20 are schematically illustrated as circular shapes. Actually, since the wire of the coil body 20, for example, the twisted wire 22c is spirally wound together with other wires and extends in a direction inclined with respect to a direction perpendicular to the paper surface of FIG. 1 (Z-axis direction), and the side wire 26 of the twisted wire 22c extends in a direction inclined with respect to the core wire 24, the outer shapes of the transverse sections of the twisted wire 22c, the core wire 24, and the side wire 26 are actually shapes (for example, oval shapes) different from circular shapes.

The coil body 20 is disposed around the core shaft 10 in such a way as to cover the core shaft 10. In the present embodiment, the coil body 20 covers the small diameter portion 11, e.g., completely covers the small diameter portion 11, and the tapered portion 12 of the core shaft 10, e.g., partially covers the tapered portion 12. The small diameter portion 11 and the tapered portion 12 are an example of a distal end side portion of the core shaft in the scope of the claims.

As materials for forming the coil body 20, for example, metallic materials, more specifically, stainless steels (SUS302, SUS304, SUS316, etc.), piano wires, superelastic alloys such as Ni—Ti alloys, or radiopaque materials such as platinum, gold, tungsten, or alloys thereof are used. The coil body 20 may be wholly formed of the same material or may be partially formed of materials different from one another.

The distal end side joint part 30 joins a distal end of the coil body 20 and the distal end of the core shaft 10. The distal end of the coil body 20 and the distal end of the core shaft 10 are fixed in such a way as to be embedded inside the distal end side joint part 30. The proximal end side joint part 32 joins a proximal end of the coil body 20 with the core shaft 10. As a material for forming the distal end side joint part 30 and the proximal end side joint part 32, for example, a metal solder (Au—Sn alloy, Sn—Ag alloy, Sn—Pb alloy, Pb—Ag alloy, etc.), a brazing material (aluminum alloy solder, silver solder, gold solder, etc.), an adhesive (epoxybased adhesive, etc.), or the like is used. The materials for forming the distal end side joint part 30 and the proximal end side joint part 32 may be the same as or different from each other. In addition, each of the distal end side joint part 30 and the proximal end side joint part may be wholly formed of the same material or may be partially formed of different materials from one another.

An inner coil body 40 is provided between the coil body 20 and the core shaft 10. The inner coil body 40 is accommodated in a second cylindrical portion L2, which will be described later, and is disposed in such a way as to surround a part of the distal end side portion of the core shaft 10. A distal end of the inner coil body 40 is joined to the distal end side joint part 30, and a proximal end of the inner coil body 40 is joined to the small diameter portion 11 of the core shaft 10 via a proximal end side joint part (not illustrated). The inner coil body 40 is an example of an inner cylindrical body in the scope of the claims.

The inner coil body 40 is a coil-shaped member formed into a hollow cylindrical shape by spirally winding one wire or a plurality of wires. A solid wire 42 is used as the wire of the inner coil body 40 illustrated in FIG. 1. The inner coil body 40 is composed of, for example, six solid wires 42*a*, 42*b*, 42*c*, 42*d*, 42*e*, and 42*f*. For the inner coil body 40, for example, metallic materials, more specifically, stainless steels (SUS302, SUS304, SUS316, etc.), piano wires, superelastic alloys such as Ni—Ti alloys, or radiopaque materials such as platinum, gold, tungsten, or alloys thereof are used.

As illustrated in FIG. 1, a distal end portion of the guide wire 100 is bent at a predetermined angle in the guide wire 100. To be specific, the core shaft 10 and the coil body 20 to be used as the cylindrical body are bent (inflected or curved) at the second cylindrical portion L2 to be described later. In detail, the small diameter portion 11 of the core shaft 10, the coil body 20, and the inner coil body 40 are bent at a predetermined angle. This improves the blood vessel selectivity of the guide wire 100 (the performance to select a specific blood vessel from a plurality of branched blood vessels and advance the distal end portion of the guide wire 100 into the selected blood vessel).

A-2. Detailed Configuration of Coil Body 20

Figure 2:
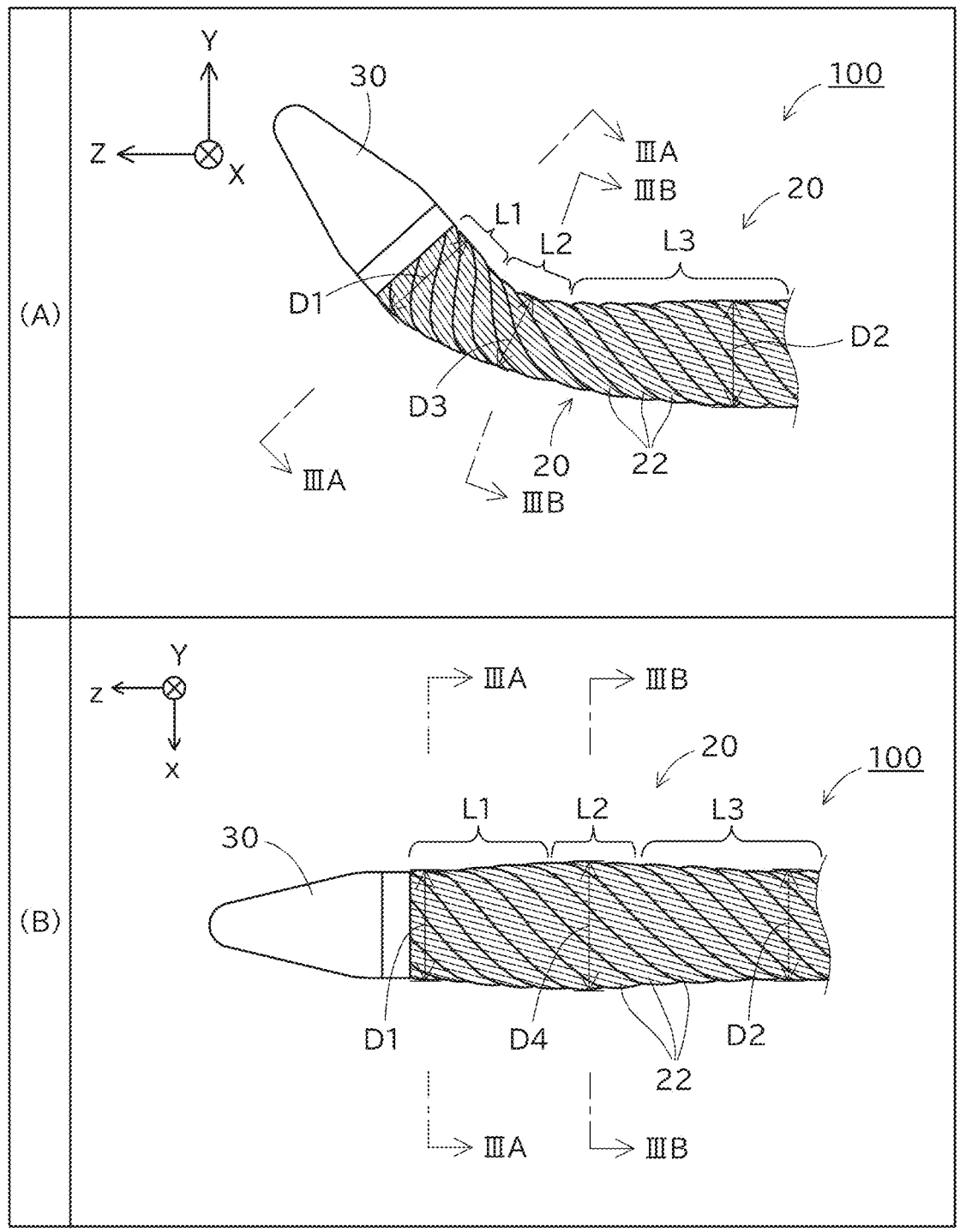
FIG. 2 is an explanatory view illustrating an external appearance configuration of a distal end portion of the guide wire.
Figure 3:
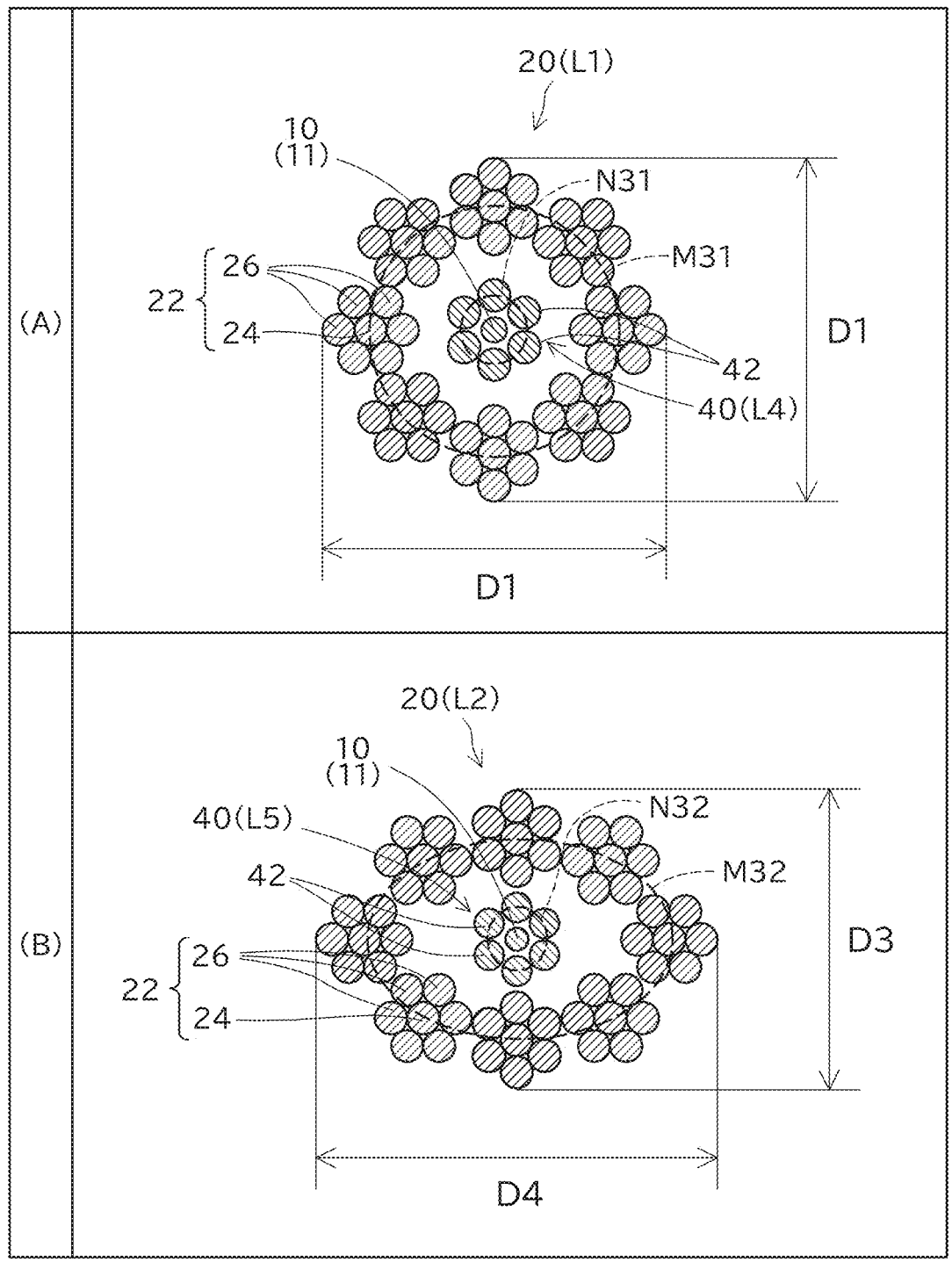
FIG. 3 is an explanatory view illustrating a transverse sectional configuration of a distal end portion of the guide wire.

FIG. 2 is an explanatory view illustrating an external appearance configuration of the distal end portion of the guide wire 100. (A) of FIG. 2 illustrates a YZ side configuration of the distal end portion of the guide wire 100 as viewed from the X-axis direction, and (B) of FIG. 2 illustrates an XZ side configuration of the distal end portion of the guide wire 100 as viewed from the Y-axis direction. FIG. 3 is an explanatory view illustrating a transverse sectional configuration of the distal end portion of the guide wire 100. (A) of FIG. 3 illustrates a transverse sectional configuration of the core shaft 10 (a first cylindrical portion L1, which will be described later, of the coil body 20) at a position of IIIA-IIIA in FIG. 2, and (B) of FIG. 3 illustrates a transverse sectional configuration of the core shaft 10 (a second cylindrical portion L2, which will be described later, of the coil body 20) at a position of IIIB-IIIB in FIG. 2.

As illustrated in FIGS. 1 and 2, the coil body 20 includes a first cylindrical portion L1, a second cylindrical portion L2, and a third cylindrical portion L3. The first cylindrical portion L1 is a portion including the distal end of the coil body 20 and extending linearly along the axial direction of the guide wire 100 (the distal end portion of the small diameter portion 11 of the core shaft 10). The first cylindrical portion L1 surrounds the small diameter portion 11 and a linear distal end portion of the inner coil body 40. The third cylindrical portion L3 is a portion including the proximal end of the coil body 20 and extending linearly along the axial direction of the guide wire 100 (a proximal end portion of the small diameter portion 11 of the core shaft 10). The third cylindrical portion L3 surrounds the small diameter portion 11, a part of the tapered portion 12, and the linear proximal end portion of the inner coil body 40. The second cylindrical portion L2 is a deformed portion that connects the first cylindrical portion L1 and the third cylindrical portion L3. The second cylindrical portion L2 surrounds the small diameter portion 11 and a bent portion of the inner coil body 40.

As illustrated in (A) of FIG. 3, an outer shape of the transverse section of the first cylindrical portion L1 of the coil body 20 is circular. In detail, in the transverse section of the first cylindrical portion L1, the center or the center of gravity of twisted wires 22 (twisted wires 22*a*, 22*b*, 22*c*, 22*d*, 22*e*, 22*f*, 22*g*, and 22*h*) is disposed on a circle M31. In addition, in the inner coil body 40, an outer shape of a transverse section of a first inner cylindrical portion L4 located inside the first cylindrical portion L1 is circular. In detail, in the transverse section of the first inner cylindrical portion L4, the center or the center of gravity of the solid wires 42 (42*a*, 42*b*, 42*c*, 42*d*, 42*e*, and 42*f*) is disposed on a circle N31.

As illustrated in (B) of FIG. 3, an outer shape of a transverse section of the second cylindrical portion L2 of the coil body 20 is non-circular, for example, an oval shape. In detail, in the transverse section of the second cylindrical portion L2, the center or the center of gravity of the twisted wires 22 (twisted wires 22*a*, 22*b*, 22*c*, 22*d*, 22*e*, 22*f*, 22*g*, and 22*h*) is disposed on an oval M32. In this specification, the "oval shape" includes an elliptical shape. In addition, in the inner coil body 40, an outer shape of a transverse section of a second inner cylindrical portion L5 located inside the second cylindrical portion L2 is circular. In detail, in the transverse section of the second inner cylindrical portion L5, the center or the center of gravity of the solid wires 42 (42*a*, 42*b*, 42*c*, 42*d*, 42*e*, and 42*f*) is disposed on a circle N32.

As illustrated in FIG. 3, a maximum dimension D4 of the outer shape of the transverse section of the second cylindrical portion L2 of the coil body 20 (hereinafter referred to as the "maximum dimension D4 of the second cylindrical portion L2") is larger than a maximum dimension D1 of the outer shape of the transverse section of the first cylindrical portion L1 (a diameter: hereinafter referred to as the "maximum dimension D1 of the first cylindrical portion L1"). As illustrated in (B) of FIG. 2, when viewed from the lateral direction (Y-axis direction) of the outer shape of the transverse section of the second cylindrical portion L2, a widthwise dimension of the coil body 20 gradually changes in such a way as to continuously narrow from the second cylindrical portion L2 toward the first cylindrical portion L1.

As illustrated in FIG. 3, a minimum dimension D3 of the outer shape of the transverse section of the second cylindrical portion L2 of the coil body 20 (hereinafter referred to as the "minimum dimension D3 of the second cylindrical portion L2") is smaller than a minimum dimension D1 of the outer shape of the transverse section of the first cylindrical portion L1 (diameter: hereinafter referred to as the "minimum diameter D1 of the first cylindrical portion L1"). As illustrated in (A) of FIG. 2, when viewed from the longitudinal direction (X-axis direction) of the outer shape of the transverse section of the second cylindrical portion L2, the widthwise dimension of the coil body 20 gradually changes in such a way as to continuously widen from the second cylindrical portion L2 toward the first cylindrical portion L1. With such a configuration, a change in insertion resistance, which will be described later, of the guide wire 100 in the blood vessel can be made gentle.

As illustrated in FIG. 2, the outer shape of the transverse section of the third cylindrical portion L3 of the coil body 20 is identical to the outer shape of the transverse section of the first cylindrical portion L1, and the dimensions are also identical (D2=D1). The maximum dimension D2 of the outer shape of the transverse section of the third cylindrical portion L3 of the coil body 20 is smaller than the maximum dimension D4 (diameter) of the second cylindrical portion L2. As illustrated in (B) of FIG. 2, when viewed from the lateral direction (Y-axis direction) of the outer shape of the transverse section of the second cylindrical portion L2, the widthwise dimension of the coil body 20 gradually changes in such a way as to continuously narrow from the second cylindrical portion L2 toward the third cylindrical portion L3.

As illustrated in FIG. 2, a minimum dimension D2 (diameter) of the outer shape of the transverse section of the third cylindrical portion L3 is larger than the minimum dimension D3 of the second cylindrical portion L2. As illustrated in (A) of FIG. 2, when viewed from the longitudinal direction (X-axis direction) of the outer shape of the transverse section of the second cylindrical portion L2, the widthwise dimension of the coil body 20 gradually changes in such a way as to continuously widen from the second cylindrical portion L2 toward the third cylindrical portion L3.

A ratio (=D4/D1) of the maximum dimension D4 of the second cylindrical portion L2 of the coil body 20 to the maximum dimension D1 of the first cylindrical portion L1 of the coil body 20 may be 1.02 or more and 1.19 or less. A ratio (=D3/D1) of the minimum dimension D3 of the second cylindrical portion L2 of the coil body 20 to the minimum dimension D1 of the first cylindrical portion L1 of the coil body 20 may be 0.81 or 0.98 or less. A ratio (=D4/D3) of the maximum dimension D4 of the second cylindrical portion L2 of the coil body 20 to the minimum dimension D3 of the second cylindrical portion L2 may be 1.03 or more and 1.45 or less.

As illustrated in (A) of FIG. 3, the first cylindrical portion L1 of the coil body 20 is separated from the inner coil body 40 over the entire circumference. On the other hand, as illustrated in (B) of FIG. 3, a separation distance between the second cylindrical portion L2 and the inner coil body 40 in the longitudinal direction of the second cylindrical portion L2 is longer than a separation distance between the second cylindrical portion L2 and the inner coil body 40 in the lateral direction thereof.

A-3. Method of Producing Guide Wire 100

For example, the guide wire 100 according to the present embodiment can be produced by a method to be described below. First, the core shaft 10 whose shape is processed by mechanical polishing or the like, the coil body 20 (having a circular transverse section) produced by spirally winding a plurality of (for example, eight) twisted wires (wires), and the inner coil body 40 (having a circular transverse section) produced by spirally winding six solid wires (wires) are prepared. The inner coil body 40 is fixed around the small diameter portion 11 of the core shaft 10. The core shaft 10 and the inner coil body 40 may be linear over the entire length and may each have no bent portion.

The core shaft 10 to which the inner coil body 40 is fixed is inserted into a hollow portion of the coil body 20, whereby the distal end side joint part 30 and the proximal end side joint part 32, which join the coil body 20 and the core shaft 10, are formed. Thereafter, the coil body 20 is plastically deformed in such a way that the outer shape of its transverse section becomes oval while a force is applied from a direction orthogonal to the axial direction of the coil body 20 to a predetermined part to be the second cylindrical portion L2 in the coil body 20, and at the same time, a bending work is performed. Thus, the coil body 20 having the second cylindrical portion L2 is formed. The guide wire 100 having the aforementioned configuration can be produced, for example, by the method as described above.

A-4. Advantageous Effects of Present Embodiment

In a process in which the guide wire 100 according to the present embodiment enters, for example, a lesion in a blood vessel or a blood vessel wall (hereinafter, referred to as a "lesion or the like"), the first cylindrical portion L1 of the coil body 20 of the guide wire 100 enters the lesion or the like, and then the second cylindrical portion L2 of the coil body 20 starts to enter the lesion or the like. In the present embodiment, the maximum dimension D4 of the second cylindrical portion L2 is larger than the maximum dimension D1 of the first cylindrical portion L1 (see (B) of FIG. 2). Therefore, when the second cylindrical portion L2 starts to enter the lesion, an insertion resistance force of the guide wire 100 with respect to the blood vessel increases according to a difference in maximum dimension between the first cylindrical portion L1 and the second cylindrical portion L2 (=D4-D1). To be specific, a professional such as a doctor, who uses the guide wire 100 can sensorily grasp where the second cylindrical portion L2 of the guide wire 100 has reached in the blood vessel by sensing a change in the insertion resistance force with a hand gripping the proximal end portion of the guide wire 100. For example, since the professional can carefully perform the insertion operation of the guide wire 100 depending on the disposition of the guide wire under the X-ray fluoroscopic image during the procedure and the change in the insertion resistance of the guide wire 100, and for example, it is possible to suppress damage of the blood vessel.

In the present embodiment, the minimum dimension D3 of the second cylindrical portion L2 is smaller than the minimum dimension D1 of the first cylindrical portion L1 (see (A) FIG. 2). Therefore, according to the present embodiment, compared to a configuration in which the minimum dimension D3 of the second cylindrical portion L2 is equal to or larger than the minimum dimension D1 of the first cylindrical portion L1, it is possible to suppress a decrease in penetration performance of the guide wire 100 by an amount of the small area of the transverse section of the second cylindrical portion L2. In this way, according to the present embodiment, it is possible to suppress a decrease in the penetration performance of the guide wire 100 while suppressing damage to the blood vessel.

In the present embodiment, the maximum dimension D2 of the outer shape of the transverse section of the third cylindrical portion L3 of the coil body 20 is smaller than the maximum dimension D4 of the second cylindrical portion L2 (see (B) of FIG. 2). Therefore, according to the present embodiment, for example, compared to a configuration in which the maximum dimension D2 of the outer shape of the transverse section of the third cylindrical portion L3 is equal to or larger than the maximum dimension D4 of the second cylindrical portion L2, it is possible to suppress an excessive increase in the insertion resistance of the guide wire 100 as a whole.

In the present embodiment, the outer shape of the transverse section of the first cylindrical portion L1 is a circle (e.g., a perfect circle), and the outer shape of the transverse section of the second cylindrical portion L2 is oval. Therefore, according to the present embodiment, for example, compared to a configuration in which the outer shape of the transverse section of the first cylindrical portion L1 is also an oval shape or the like, it is possible to perform a smooth rotation operation of the distal end portion of the guide wire 100.

In the present embodiment, among the twisted wires (an example of the wires of the coil body 20) 22a, 22b, 22c, 22d, 22e, 22f, 22g, and 22h included in the coil body 20, portions adjacent to each other along the longitudinal direction of the coil body 20 are in contact, e.g., direct contact. Therefore, according to the present embodiment, the second cylindrical portion L2 can be easily produced by applying a mechanical force to the coil body 20.

B. Second Embodiment

B-1. Configuration of Guide Wire 100a

Figure 4:
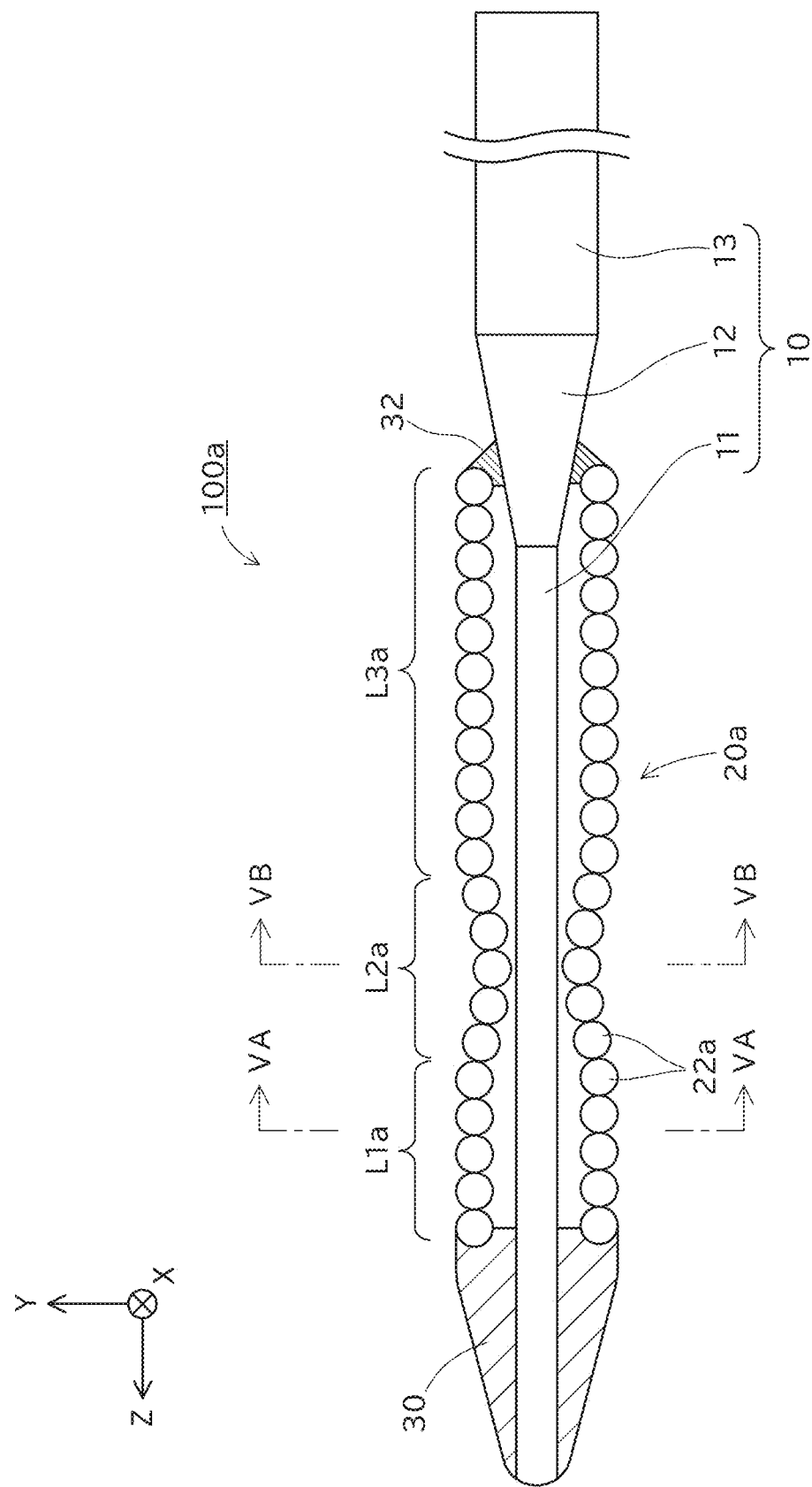
FIG. 4 is an explanatory view schematically illustrating a configuration of a guide wire according to a second embodiment.

FIG. 4 is an explanatory view schematically illustrating a configuration of a guide wire 100a according to a second embodiment. FIG. 4 illustrates an entire configuration of the guide wire 100a as viewed in a X-axis positive direction, and illustrates a longitudinal sectional configuration of a coil body 20a and a distal end side joint part 30 which will be described later.

The configuration of the guide wire 100a according to the second embodiment is different from the configuration of the guide wire 100 according to the above-described first embodiment in the configuration of the coil body 20a. In addition, the configuration of the guide wire 100a according to the second embodiment is different from the configuration of the guide wire 100 according to the first embodiment in that no inner cylindrical body (inner coil body 40) is provided and the guide wire 100a has no bent portion. Hereinafter, among components of the guide wire 100a according to the second embodiment, a component that is identical to the above-described components of the guide wire 100 according to the first embodiment is provided with the same reference sign as in the first embodiment, thereby omitting the description thereof as appropriate.

As illustrated in FIG. 4, the guide wire 100a includes a core shaft 10, a coil body 20a, a distal end side joint part 30, and a proximal end side joint part 32. The coil body 20a is formed into a hollow cylindrical shape by densely winding, for example, ten wires 22a (solid wires). The coil body 20 is disposed around a core shaft 10a in such a way as to cover the core shaft 10. Herein, the guide wire 100a has not been subjected to shaping, and neither the core shaft 10a nor the coil body 20a has a bent portion. In addition, no inner cylindrical body is provided between the core shaft 10 and the 20a of the coil body.

Figure 5:
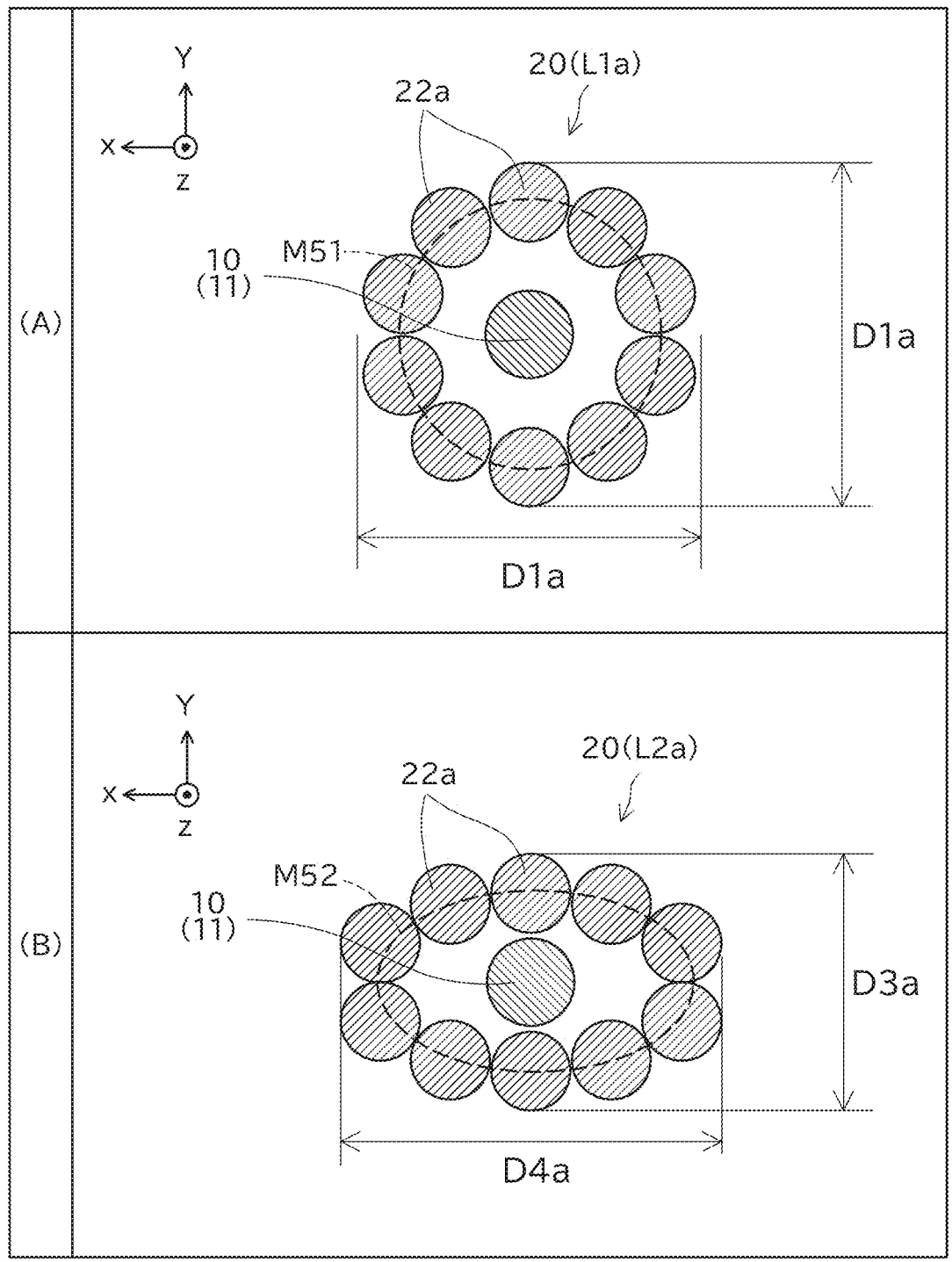
FIG. 5 is an explanatory view illustrating a transverse sectional configuration of a distal end portion of the guide wire.

FIG. 5 is an explanatory view illustrating a transverse sectional configuration of a distal end portion of the guide wire 100a. (A) of FIG. 5 illustrates a transverse sectional configuration of the core shaft 10a (a later-described first cylindrical portion L1a of the coil body 20a) at a position of VA-VA in FIG. 4, and (B) of FIG. 5 illustrates a transverse sectional configuration of the core shaft 10a (a later-described second cylindrical portion L2a of the coil body 20a) at a position of VB-VB in FIG. 4.

As illustrated in FIG. 4, the coil body 20a includes a first cylindrical portion L1a, a second cylindrical portion L2a, and a third cylindrical portion L3a. The first cylindrical portion L1a is a portion including a distal end of the coil body 20a and extending linearly along the axial direction of the guide wire 100a (a distal end portion of the small diameter portion 11 of the core shaft 10). The third cylindrical portion L3a is a portion including a proximal end of the coil body 20a and extending linearly along the axial direction of the guide wire 100a (a proximal end portion of the small diameter portion 11 of the core shaft 10). The second cylindrical portion L2a is a portion connecting the first cylindrical portion L1a and the third cylindrical portion L3a and extending linearly along the axial direction of the guide wire 100a (the small diameter portion 11 of the core shaft 10).

As illustrated in (A) of FIG. 5, an outer shape of a transverse section of the first cylindrical portion L1a of the coil body 20a is a circle (e.g., a perfect circle). In detail, in the transverse section of the first cylindrical portion L1a, the center or the center of gravity of wires (solid wires) 22a is disposed on a circle M51. As illustrated in (B) in FIG. 5, in a transverse section of the second cylindrical portion L2a, the center or the center of gravity of wires (solid wires) 22a is disposed on an oval (ellipse) M52.

A maximum dimension D4a of an outer shape of a transverse section of the second cylindrical portion L2a of the coil body 20 is larger than a maximum dimension D1a of the outer shape of the transverse section of the first cylindrical portion L1a. In addition, a minimum dimension D3a of the outer shape of the transverse section of the second cylindrical portion L2a of the coil body 20a is smaller than the minimum dimension D1a of the outer shape of the transverse section of the first cylindrical portion L1a.

In this way, the guide wire 100a according to the present embodiment that does not have a bent portion can also suppress a decrease in penetration performance of the guide wire 100a while suppressing damage to a blood vessel. By manually bending the second cylindrical portion L2a, the professional can use the guide wire 100a in a state where the second cylindrical portion L2a is set in a curved or bent shape (in a shaped state).

C. Modifications

The technique disclosed herein is not limited to the embodiments described above, and various modifications can be modified into various forms within a scope that does not depart from the gist thereof. For example, the following modifications can be made.

The configurations of the guide wires 100, 100a according to the above-described embodiments are merely examples and may be modified in various ways. In each of the above-described embodiments, a coating layer may be formed on the outermost periphery of the guide wire 100, 100a (the outer periphery of the coil body 20). As a material for forming a coating layer, for example, a hydrophobic coating material such as silicone oil or fluororesin, or a hydrophilic coating material such as polyvinylpyrrolidone, polyacrylic acid, polyacrylamide, polyvinyl alcohol, maleic anhydride copolymer, or hyaluronic acid is used. Note that the coating layer may be hydrophilic to improve the penetrability of the guide wires 100, 100a into the lesion.

In each of the above-described embodiments, the coil bodies 20 and 20a cover the small diameter portion 11 and the tapered portion 12 of the core shaft 10, but the portion of the core shaft 10 to be covered by the coil bodies 20 and 20a can be optionally changed. For example, the coil bodies 20 and 20a may cover only the small diameter portion 11 of the core shaft 10, or the coil bodies 20 and 20a may cover a part or all of the large diameter portion 13 in addition to the small diameter portion 11 and the tapered portion 12 of the core shaft 10. In addition, in each of the above-described embodiments, the coil bodies 20 and 20a are exemplified as the cylindrical bodies. However, the cylindrical body may be, for example, a pipe body (so-called slit pipe) having flexibility by forming a slit, or a tube body having flexibility by being formed of an elastic material or the like.

In the first embodiment, the coil body 20 is formed in a hollow cylindrical shape by spirally winding a plurality of the twisted wires 22 formed by twisting a plurality of the wires 24 and 26. However, the coil body 20 may be formed by spirally winding one or a plurality of wires (solid wires or twisted wires) densely or coarsely. In addition, the twisted wire 22 may not include the core wire 24 and may be constituted only by the side wires 26.

In the first embodiment, the guide wire 100 may not have the bent portion at the time of shipment of the guide wire 100, and the coil body 20 may have the first cylindrical portion L1 and the second cylindrical portion L2. In such a case, in a treatment called "shaping" in which a professional such as a doctor bends the distal end portion (the second cylindrical portion L2) of the guide wire 100 at a predetermined angle in advance before inserting the guide wire 100 into a blood vessel or the like, the shaping is performed in such a way that the outer shape of the transverse section of the first cylindrical portion and the outer shape of the transverse section of the second cylindrical portion satisfy the predetermined dimensional relationship (the maximum dimension of the outer shape of the transverse section of the second cylindrical portion is larger than the maximum dimension of the outer shape of the transverse section of the first cylindrical portion, and the minimum dimension of the outer shape of the transverse section of the second cylindrical portion is smaller than the minimum dimension of the outer shape of the transverse section of the first cylindrical portion). In the above embodiment, the inner coil body 40 may not be provided.

In the first embodiment, the outer shape of the transverse section of the first cylindrical portion L1 of the coil body 20 is not limited to a circular shape, and may be an oval shape, a polygonal shape, or the like as long as the above-described predetermined dimensional relationship is satisfied. In addition, the outer shape of the transverse section of the second cylindrical portion L2 of the coil body 20 may be any non-circular shape that satisfies the above-described predetermined dimensional relationship, for example, an oval shape, but is not limited to this, and may also be a long round shape, a rectangle, or the like. In short, advantageous effects of the present disclosure can be achieved when the relationship (predetermined dimensional relationship) holds that the maximum dimension D4 of the second cylindrical portion L2 of the coil body 20 is larger than the maximum dimension D1 of the first cylindrical portion L1, and the minimum dimension D3 of the second cylindrical portion L2 of the coil body 20 is smaller than the minimum dimension D1 of the first cylindrical portion L1. Further, in the above embodiment, when viewed from the longitudinal direction (X-axis direction) of the outer shape of the transverse section of the second cylindrical portion L2, the widthwise dimension of the coil body 20 may be configured to change in such a way as to widen in a stepwise manner from the second cylindrical portion L2 toward the first cylindrical portion L1. In addition, when viewed from the lateral direction (Y-axis direction) of the outer shape of the transverse section of the second cylindrical portion L2, the widthwise dimension of the coil body 20 may be configured to change in such a way as to narrow in a stepwise manner from the second cylindrical portion L2 toward the first cylindrical portion L1.

In the first embodiment, the minimum dimension D2 of the outer shape of the transverse section of the third cylindrical portion L3 may be equal to or smaller than the minimum dimension D3 of the second cylindrical portion L2. In the first embodiment, the maximum dimension D2 of the outer shape of the transverse section of the third cylindrical portion L3 of the coil body 20 may be equal to or larger than the maximum dimension D4 of the second cylindrical portion L2. For example, as illustrated in FIG. 2 of the first embodiment, when the maximum dimension D2 of the outer shape of the transverse section of the third cylindrical portion L3 is closer to the maximum dimension D1 of the first cylindrical portion L1 than the maximum dimension D4 of the second cylindrical portion L2, and the minimum dimension D2 of the outer shape of the transverse section of the third cylindrical portion L3 is closer to the minimum dimension D1 of the first cylindrical portion L1 than the minimum dimension D3 of the second cylindrical portion L2, an insertion resistance of portions other than the second cylindrical portion L2 is substantially uniform, and therefore, insertability and operability of the guide wire 100 are improved as a whole.

Figure 6:
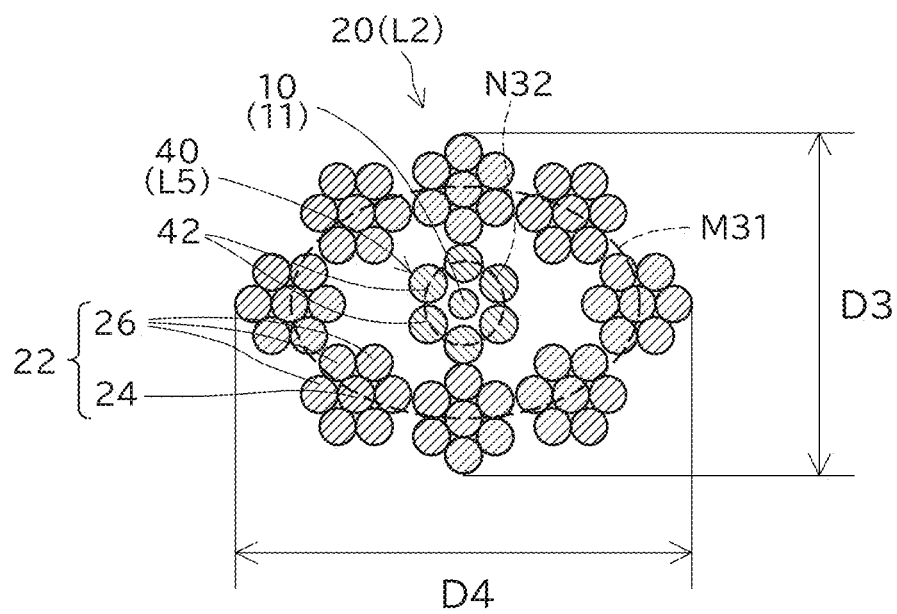
FIG. 6 is an explanatory view illustrating a transverse sectional configuration of a distal end portion of a guide wire according to a modification 1 of the first embodiment.

FIG. 6 is an explanatory view illustrating a transverse sectional configuration of a distal end portion of a guide wire according to a modification 1 of the first embodiment. As illustrated in FIG. 6, the modification 1 is different from the first embodiment in that the second cylindrical portion L2 of the coil body 20 and the second inner cylindrical portion L5 of the inner coil body 40 are in contact, e.g., direct contact, and other points are common to the first embodiment. In the modification 1, the minimum value of an inner diameter of the second cylindrical portion L2 of the coil body 20 is equal to an outer diameter of the second inner cylindrical portion L5 of the inner coil body 40. In detail, in the lateral direction of the transverse section of the second cylindrical portion L2, the second cylindrical portion L2 (a pair of twisted wires 22 (side wires 26)) located on both sides) is in contact with the second inner cylindrical portion L5 in such a way as to sandwich the second inner cylindrical portion L5 therebetween. According to the present modification 1, when the core shaft 10 is rotationally operated, the second cylindrical portion L2 and the second inner cylindrical portion L5 are easily rotated integrally with each other due to the frictional resistance generated therebetween. Therefore, in addition to the advantageous effects of the guide wire 100 of the first embodiment, it is possible to improve the torquability (particularly, torquability at the initial stage of rotation) of the guide wire 100.

Figure 7:
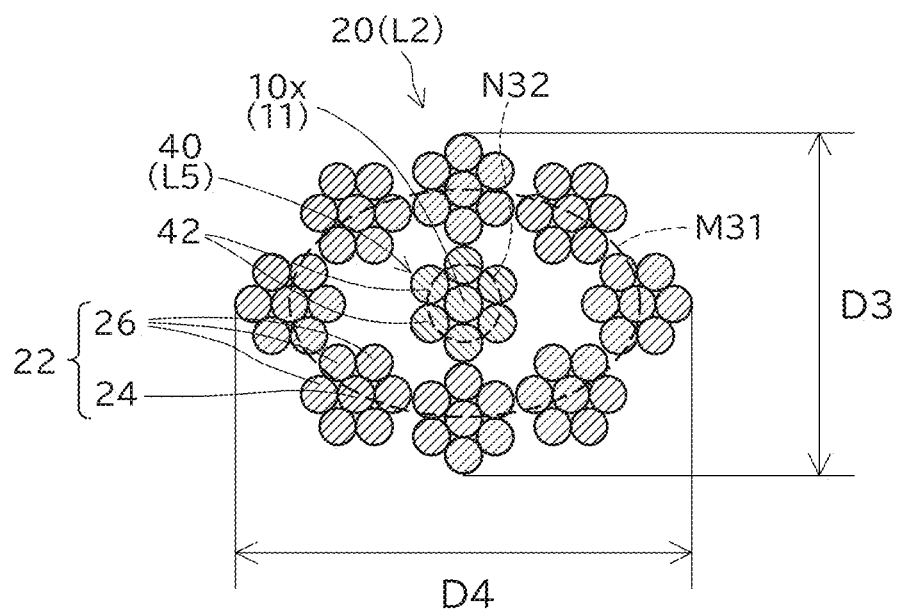
FIG. 7 is an explanatory view illustrating a transverse sectional configuration of a distal end portion of a guide wire according to a modification 2 of the first embodiment.

FIG. 7 is an explanatory view illustrating a transverse sectional configuration of a distal end portion of a guide wire according to a modification 2 of the first embodiment. As illustrated in FIG. 7, the modification 2 is different from the modification 1 in that the second inner cylindrical portion L5 and the core shaft 10x (the small diameter portion 11) are in contact, e.g., direct contact, and is common to the modification 1 in other respects. In the modification 2, the minimum value of an inner diameter of the second inner cylindrical portion L5 of the coil body 40 is equal to a diameter (the maximum value of the diameter) of the core shaft 10x. In detail, the second inner cylindrical portion L5 (solid wire 42) is in contact with an outer peripheral surface of the core shaft 10*x* in such a way as to surround a periphery of the core shaft 10*x*. According to the modification 2, when the core shaft 10*x* is rotationally operated, the second cylindrical portion L2 and the core shaft 10*x* easily rotate integrally with each other due to frictional resistance generated therebetween. Therefore, in addition to the advantageous effect of the guide wire 100 of the modification 1, it is possible to effectively improve torquability (particularly, torquability at the initial stage of rotation) of the guide wire 100.

Figure 8:
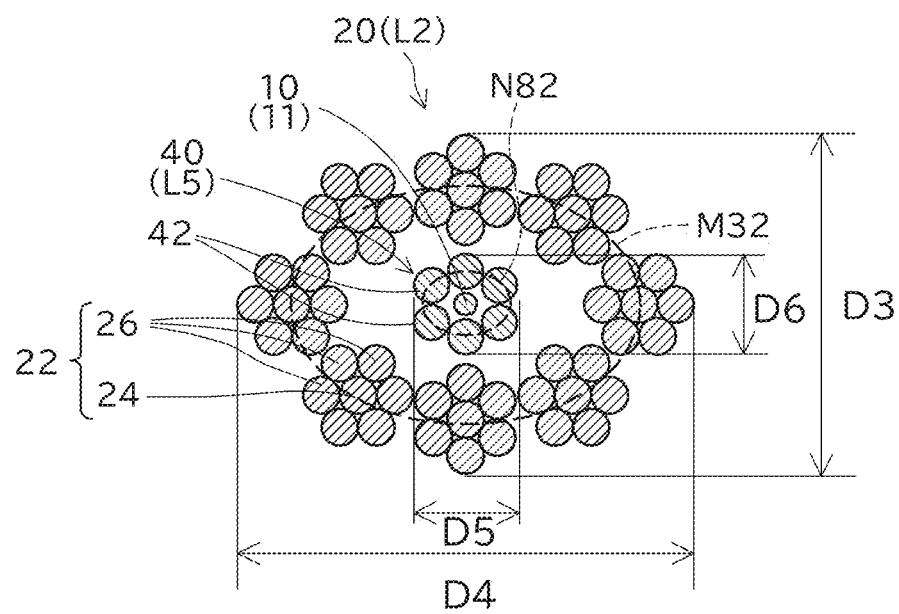
FIG. 8 is an explanatory view illustrating a transverse sectional configuration of a distal end portion of a guide wire according to a modification 3 of the first embodiment.

FIG. 8 is an explanatory view illustrating a transverse sectional configuration of a distal end portion of a guide wire according to a modification 3 of the first embodiment. As illustrated in FIG. 8, in the modification 3, the outer shape of the second inner cylindrical portion L5 of the inner coil body 40 is oval. In detail, in the transverse section of the second inner cylindrical portion L5, the center or the center of gravity of solid wires 42 is disposed on an oval (ellipse) N82. A maximum dimension D5 of the outer shape of the transverse section of the second inner cylindrical portion L5 is larger than a minimum dimension D6. The maximum dimension D5 of the outer shape of the transverse section of the second inner cylindrical portion L5 is larger than the maximum dimension of the outer shape of the transverse section of the first inner cylindrical portion L4 (see (A) of FIG. 3), and the minimum dimension D6 of the outer shape of the transverse section of the second inner cylindrical portion L5 is smaller than a minimum dimension of the outer shape of the transverse section of the first inner cylindrical portion L4 (see (A) FIG. 3). According to the present modification 3, a portion having an oval transverse section formed by applying a mechanical force to a hollow cylindrical member is used as the second inner cylindrical portion L5, and a portion having a circular transverse section without being applied with the mechanical force is used as the first inner cylindrical portion L4, whereby a guide wire that satisfies the above-described "predetermined dimensional relationship of inner cylindrical body" can be easily acquired. In addition, when the core shaft 10 is rotationally operated, the second cylindrical portion L2 and the second inner cylindrical portion L5, which are non-circular portions, engage with each other and easily rotate integrally. Therefore, in addition to the advantageous effects of the guide wire 100 according to the first embodiment, the torquability of the guide wire 100 can be further improved. When the maximum dimension D5 of the second inner cylindrical portion L5 is larger than the minimum value of an inner diameter of the second cylindrical portion L2, the second cylindrical portion L2 and the second inner cylindrical portion L5 are more easily engaged with each other, and thus the torquability of the guide wire 100 can be further improved.

Figure 9:
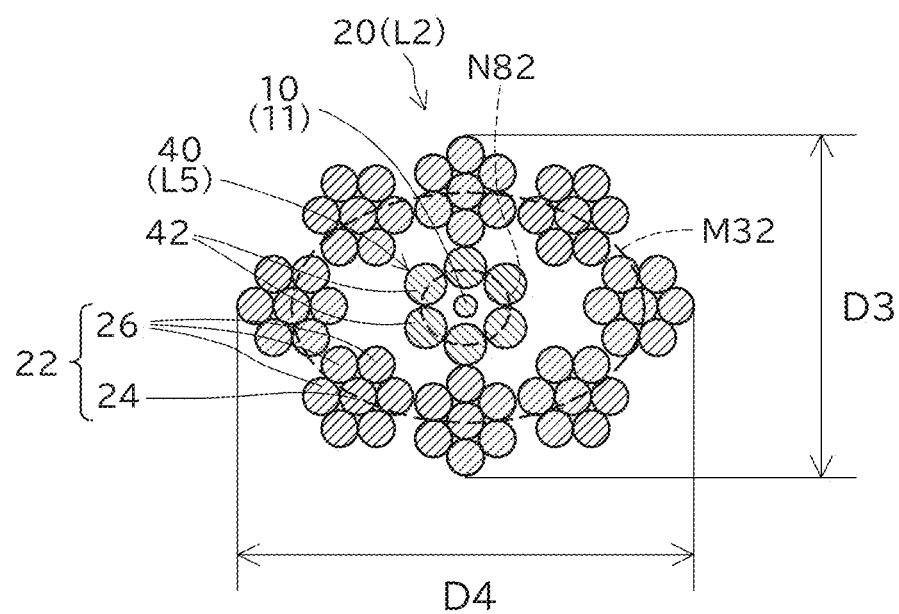
FIG. 9 is an explanatory view illustrating a transverse sectional configuration of a distal end portion of a guide wire according to a modification 4 of the first embodiment.

FIG. 9 is an explanatory view illustrating a transverse sectional configuration of a distal end portion of a guide wire according to a modification 4 of the first embodiment. As illustrated in FIG. 9, the modification 4 is different from the modification 3 in that the second cylindrical portion L2 of the coil body 20 and the second inner cylindrical portion L5 of the inner coil body 40 are in contact, e.g., direct contact, in the transverse section of the second cylindrical portion L2 of the coil body 20, and the other points are common to the modification 3. In the modification 4, the minimum value of the inner diameter of the second cylindrical portion L2 of the coil body 20 is equal to the minimum value of an outer diameter of the second inner cylindrical portion L5 of the inner coil body 40. In detail, in the lateral direction of the second cylindrical portion L2, the second cylindrical portion L2 (a pair of twisted wires 22 (side wires 26)) is located on both sides) is in contact with the second inner cylindrical portion L5 in such a way as to sandwich the second inner cylindrical portion L5 therebetween. According to the modification 4, when the core shaft 10 is rotationally operated, the second cylindrical portion L2 and the second inner cylindrical portion L5 easily rotate integrally with each other due to frictional resistance generated therebetween. Therefore, in addition to the advantageous effect of the guide wire 100 of the modification 3, it is possible to further improve the torquability (particularly, torquability at the initial stage of rotation) of the guide wire 100.

Figure 10:
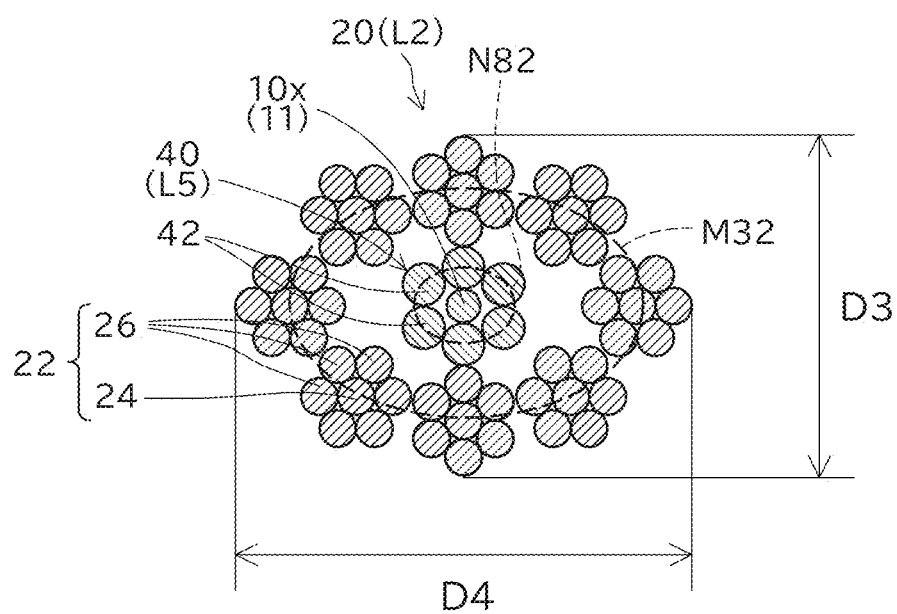
FIG. 10 is an explanatory view illustrating a transverse sectional configuration of a distal end portion of a guide wire according to a modification 5 of the first embodiment.

FIG. 10 is an explanatory view illustrating a transverse sectional configuration of a distal end portion of a guide wire according to a modification 5 of the first embodiment. As illustrated in FIG. 10, the modification 5 is different from the modification 4 in that the second inner cylindrical portion L5 and the core shaft 10*x* (the small diameter portion 11) are in contact, e.g., direct contact, and is common to the modification 4 in other respects. In the modification 5, the minimum value of the inner diameter of the second inner cylindrical portion L5 of the coil body 40 is equal to the diameter (the maximum value of the diameter) of the core shaft 10*x*. In detail, the second inner cylindrical portion L5 (solid wire 42) is in contact with an outer peripheral surface of the core shaft 10*x* in such a way as to surround a periphery of the core shaft 10*x*. According to the modification 5, when the core shaft 10*x* is rotationally operated, the second cylindrical portion L2 and the core shaft 10*x* easily rotate integrally with each other due to frictional resistance generated therebetween. Therefore, in addition to the advantageous effect of the guide wire 100 of the modification 4, it is possible to effectively improve torquability (particularly, torquability at the initial stage of rotation) of the guide wire 100.

The material for each member according to the above-described embodiments is merely an example and may be variously modified. Also, the production method for the guide wires according to the above-described embodiments is merely an example and may be variously modified. For example, a coil body may be formed by partially crushing the shape of a core metal (core shaft) having a circular transverse section and winding a wire or a twisted wire around the partially crushed core metal.

In the above-described embodiments, the guide wire for guiding the catheter to a target position in the blood vessel has been described as an example. However, the technology disclosed in the present specification can be similarly applied to a guide wire for guiding a medical device to a target position in a body cavity (blood vessel, digestive tract, ureter, or the like).

Note that the present technology can also be configured as described below.

(1) A guide wire disclosed in the present specification includes: a core shaft; and a cylindrical body disposed in such a way as to surround an outer periphery of a distal end side portion of the core shaft, the cylindrical body including a first cylindrical portion and a second cylindrical portion located on a proximal end side of the cylindrical body with respect to the first cylindrical portion, and a maximum dimension of an outer shape of a transverse section of the second cylindrical portion is larger than a maximum dimension of an outer shape of a transverse section of the first cylindrical portion, and a minimum dimension of an outer shape of a transverse section of the second cylindrical portion is smaller than a minimum dimension of an outer shape of a transverse section of the first cylindrical portion. Hereinafter, such a dimensional relationship is referred to as a "predetermined dimensional relationship of the cylindrical body".

In a process in which the guide wire passes through, for example, a lesion in a body cavity, the first cylindrical portion of the guide wire enters the lesion, and then the second cylindrical portion of the guide wire starts to enter the lesion. Herein, in the present guide wire, the maximum dimension of the outer shape of the transverse section of the second cylindrical portion is larger than the maximum dimension of the outer shape of the transverse section of the first cylindrical portion. Therefore, when the second cylindrical portion of the guide wire starts to enter the lesion or a blood vessel wall, an insertion resistance force increases in accordance with a difference in maximum dimension between the first cylindrical portion and the second cylindrical portion. For example, since a professional can carefully perform an insertion operation of a guide wire depending on the disposition of the guide wire under an X-ray fluoroscopic image during the procedure and a change in insertion resistance of the guide wire, for example, damage of the blood vessel wall may be suppressed.

In the guide wire, the minimum dimension of the outer shape of the transverse section of the second cylindrical portion is smaller than the minimum dimension of the outer shape of the transverse section of the first cylindrical portion. Therefore, according to the present guide wire, compared to a configuration in which the minimum dimension of the outer shape of the transverse section of the second cylindrical portion is equal to or larger than the minimum dimension of the outer shape of the transverse section of the first cylindrical portion, a decrease in penetration performance of the guide wire can be suppressed by an amount of the small area of the transverse section of the second cylindrical portion. According to the present guide wire, both a decrease in the penetration performance and damage to a body cavity wall may be decreased.

(2) In the above-described guide wire, the cylindrical body may include a third cylindrical portion located on a proximal end side of the cylindrical body with respect to the second cylindrical portion, and a maximum dimension of an outer shape of a transverse section of the third cylindrical portion may be smaller than a maximum dimension of an outer shape of a transverse section of the second cylindrical portion. According to the present guide wire, for example, compared to a configuration in which the maximum dimension of the outer shape of the transverse section of the third cylindrical portion is equal to or larger than the maximum dimension of the outer shape of the transverse section of the second cylindrical portion, it is possible to suppress an excessive increase in insertion resistance of the guide wire as a whole. In detail, it is possible to suppress an excessive increase in insertion resistance of the third cylindrical portion into the lesion.

(3) In the above-described guide wire, a maximum dimension of an outer shape of a transverse section of the third cylindrical portion may be closer to a maximum dimension of an outer shape of a transverse section of the first cylindrical portion than a maximum dimension of an outer shape of a transverse section of the second cylindrical portion, and a minimum dimension of the outer shape of the transverse section of the third cylindrical portion may be closer to a minimum dimension of the outer shape of the transverse section of the first cylindrical portion than a minimum dimension of the outer shape of the transverse section of the second cylindrical portion. According to the present guide wire, for example, as compared with a configuration in which the maximum dimension and the minimum dimension of the outer shape of the transverse section of the third cylindrical portion are close to the maximum dimension and the minimum dimension of the outer shape of the transverse section of the second cylindrical portion, it is possible to more effectively suppress an excessive increase in the insertion resistance of the guide wire as a whole. In detail, it is possible to more effectively suppress an excessive increase in the insertion resistance of the third cylindrical portion into the lesion.

(4) In the above-described guide wire, an outer shape of a transverse section of the first cylindrical portion may be circular, and an outer shape of a transverse section of the second cylindrical portion may be oval. According to the present guide wire, a guide wire satisfying a "predetermined dimensional relationship of the cylindrical body" can be easily acquired by forming a portion having an oval transverse section by applying a mechanical force to a hollow cylindrical member as the second cylindrical portion and forming a portion having a circular transverse section without applying the mechanical force as the first cylindrical portion. In addition, according to the present guide wire, for example, compared to a configuration in which the outer shape of the transverse section of the first cylindrical portion is also oval, it is possible to perform a smooth rotation operation of a distal end portion of the guide wire.

(5) In the above-described guide wire, the core shaft and the cylindrical body may be bent at the second cylindrical portion. According to the present guide wire, it is possible to suppress a decrease in penetration performance while improving the body cavity selectivity and suppressing damage to the body cavity wall.

(6) In the above-described guide wire, the cylindrical body may be a coil body having a configuration in which one or a plurality of wires are spirally wound. According to the present guide wire, it is possible to suppress a decrease in penetration performance while suppressing damage to a body cavity wall in a guide wire including a coil body.

(7) In the above-described guide wire described above, the wire may be a solid wire or a twisted wire. According to the present guide wire, in a guide wire including a coil body in which a wire is a solid wire or a twisted wire, it is possible to suppress a decrease in penetration performance while suppressing damage to a body cavity wall.

(8) In the above-described guide wire, portions of the wire that are adjacent to each other along a length direction of the coil body may be in contact with each other. According to the present guide wire, the second cylindrical portion can be easily produced by applying a mechanical force to the coil body.

(9) In the above-described guide wire, the cylindrical body may be a pipe body in which a slit is formed. According to the present guide wire, in the guide wire including the pipe body in which the slit is formed, it is possible to suppress a decrease in the penetration performance while suppressing damage to the body cavity wall.

(10) The guide wire described above may further include an inner cylindrical body that is accommodated in at least the second cylindrical portion of the cylindrical body and is disposed in such a way as to surround at least a part of the distal end side portion of the core shaft. According to the present guide wire, torquability of the guide wire can be improved. In detail, a force in a rotational direction, which is applied to a proximal end side of the guide wire, can be sufficiently transmitted to the distal end side.

(11) In the above-described guide wire, the inner cylindrical body may include a first inner cylindrical portion and a second inner cylindrical portion located on a proximal end side of the inner cylindrical body with respect to the first inner cylindrical portion, and a maximum dimension of an outer shape of a transverse section of the second inner cylindrical portion may be larger than a maximum dimension of an outer shape of a transverse section of the first inner cylindrical portion, and a minimum dimension of an outer shape of a transverse section of the second inner cylindrical portion may be smaller than a minimum dimension of an outer shape of a transverse section of the first cylindrical portion. Hereinafter, such a dimensional relationship is referred to as a "predetermined dimensional relationship of the inner cylindrical body". According to the present guide wire, when the core shaft is rotationally operated, the second cylindrical portion and the second inner cylindrical portion, which are non-circular, engage with each other and easily rotate integrally with each other. Therefore, the torquability of the guide wire can be further improved.

(12) In the above-described guide wire, an outer shape of a transverse section of the first inner cylindrical portion may be circular, and an outer shape of a transverse section of the second inner cylindrical portion may be oval. According to the present guide wire, a portion having an oval transverse section formed by applying a mechanical force to a hollow cylindrical member is used as the second inner cylindrical portion, and a portion having a circular transverse section without being applied with the mechanical force is used as the first inner cylindrical portion, whereby a guide wire satisfying the "predetermined dimensional relationship of the inner cylindrical body" described above can be easily acquired. In addition, when an outer shape of a transverse section of the first inner cylindrical portion is also oval, the first inner cylindrical portion is easily bent in a lateral direction of the transverse section and becomes difficult to be bent in a longitudinal direction of the transverse section. Therefore, the bending direction of the first inner cylindrical portion is limited to a predetermined direction, and as a result, for example, blood vessel selectivity may decrease. On the other hand, according to the present guide wire, since the outer shape of the transverse section of the first inner cylindrical portion is circular, the bending direction of the first inner cylindrical portion is not limited, and for example, it is possible to suppress a decrease in blood vessel selectivity.

(13) In the guide wire described above, the inner cylindrical body may include a first inner cylindrical portion and a second inner cylindrical portion located on a proximal end side of the inner cylindrical body with respect to the first inner cylindrical portion, and the second cylindrical portion of the cylindrical body and the second inner cylindrical portion of the inner cylindrical body may be in contact with each other. According to the present guide wire, when the core shaft is rotationally operated, the second cylindrical portion and the second inner cylindrical portion easily rotate integrally with each other due to frictional resistance generated between the portions. Therefore, torquability of the guide wire can be further improved.

(14) In the above-described guide wire, the inner cylindrical body may include a first inner cylindrical portion and a second inner cylindrical portion located on a proximal end side of the inner cylindrical body with respect to the first inner cylindrical portion, and the second inner cylindrical portion of the inner cylindrical body and the core shaft may be in contact with each other. According to the present guide wire, when a core shaft 10 is rotationally operated, the second inner cylindrical portion and the core shaft are easily rotated integrally with each other due to the frictional resistance generated between the second cylindrical portion and the core shaft. Therefore, the torquability of the guide wire can be further improved.

DESCRIPTION OF REFERENCE NUMERALS 10, 10a, 10x: Core shaft
11: Small diameter portion
12: Tapered portion
13: Large diameter portion
20, 20a: Coil body
22, 22a, 22b, 22c, 22d, 22e, 22f, 22g, 22h: Twisted wire
42, 42a, 42b, 42c, 42d, 42e, 42f: Solid wire
24: Core wire
26: Side wire
30: Distal end side joint part
32: Proximal end side joint part
40: Inner coil body
100, 100a: Guide wire
L1, L1a: First cylindrical portion
L2, L2a: Second cylindrical portion
L3, L3a: Third cylindrical portion
L4: First inner cylindrical portion
L5: Second inner cylindrical portion

The invention claimed is:
1. A guide wire comprising:
a core shaft; and
a cylindrical body that surrounds an outer periphery of a distal end side portion of the core shaft, wherein
the cylindrical body includes a first cylindrical portion and a second cylindrical portion located on a proximal end side of the cylindrical body with respect to the first cylindrical portion, and
a maximum dimension of an outer shape of a transverse section of the second cylindrical portion is larger than a maximum dimension of an outer shape of a transverse section of the first cylindrical portion, and a minimum dimension of the outer shape of the transverse section of the second cylindrical portion is smaller than a minimum dimension of the outer shape of the transverse section of the first cylindrical portion.
2. The guide wire according to claim 1, wherein
the cylindrical body further includes a third cylindrical portion located on a proximal end side of the cylindrical body with respect to the second cylindrical portion, and
a maximum dimension of an outer shape of a transverse section of the third cylindrical portion is smaller than the maximum dimension of the outer shape of the transverse section of the second cylindrical portion.
3. The guide wire according to claim 2,
wherein the maximum dimension of the outer shape of the transverse section of the third cylindrical portion is closer to the maximum dimension of the outer shape of the transverse section of the first cylindrical portion than the maximum dimension of the outer shape of the transverse section of the second cylindrical portion, and a minimum dimension of the outer shape of the transverse section of the third cylindrical portion is closer to the minimum dimension of the outer shape of the transverse section of the first cylindrical portion than the minimum dimension of the outer shape of the transverse section of the second cylindrical portion.

4. The guide wire according to claim 3,
wherein the outer shape of the transverse section of the first cylindrical portion is a circle, and the outer shape of the transverse section of the second cylindrical portion is oval.

5. The guide wire according to claim 3,
wherein the core shaft and the cylindrical body are bent in the second cylindrical portion.

6. The guide wire according to claim 3, wherein
the cylindrical body is a coil body includes at least one wire spirally wound.

7. The guide wire according to claim 6,
wherein the at least one wire is a solid wire or twisted wire.

8. The guide wire according to claim 6,
wherein portions of the at least one wire that are adjacent to each other along a length direction of the coil body are in contact.

9. The guide wire according to claim 3,
wherein the cylindrical body is a pipe body having a slit.

10. The guide wire according to claim 3, comprising
an inner cylindrical body in at least the second cylindrical portion of the cylindrical body that surrounds at least a part of the distal end side portion of the core shaft.

11. The guide wire according to claim 10, wherein
the inner cylindrical body includes a first inner cylindrical portion and a second inner cylindrical portion located on a proximal end side of the inner cylindrical body with respect to the first inner cylindrical portion, and
a maximum dimension of an outer shape of a transverse section of the second inner cylindrical portion is larger than a maximum dimension of an outer shape of a transverse section of the first inner cylindrical portion, and a minimum dimension of an outer shape of a transverse section of the second inner cylindrical portion is smaller than the minimum dimension of the outer shape of the transverse section of the first cylindrical portion.

12. The guide wire according to claim 11,
wherein the outer shape of the transverse section of the first inner cylindrical portion is circular, and the outer shape of the transverse section of the second inner cylindrical portion is oval.

13. The guide wire according to claim 10,
wherein the inner cylindrical body includes a first inner cylindrical portion and a second inner cylindrical portion located on a proximal end side of the inner cylindrical body with respect to the first inner cylindrical portion, and the second cylindrical portion of the cylindrical body and the second inner cylindrical portion of the inner cylindrical body are in contact.

14. The guide wire according to claim 10,
wherein the inner cylindrical body includes a first inner cylindrical portion and a second inner cylindrical portion located on a proximal end side of the inner cylindrical body with respect to the first inner cylindrical portion, and the second inner cylindrical portion of the inner cylindrical body and the core shaft are in contact.

15. The guide wire according to claim 1,
wherein the outer shape of the transverse section of the first cylindrical portion is a circle, and the outer shape of the transverse section of the second cylindrical portion is oval.

16. The guide wire according to claim 1,
wherein the core shaft and the cylindrical body are bent in the second cylindrical portion.

17. The guide wire according to claim 1, comprising
an inner cylindrical body in at least the second cylindrical portion of the cylindrical body that surrounds at least a part of the distal end side portion of the core shaft.

18. The guide wire according to claim 17, wherein
the inner cylindrical body includes a first inner cylindrical portion and a second inner cylindrical portion located on a proximal end side of the inner cylindrical body with respect to the first inner cylindrical portion, and
a maximum dimension of an outer shape of a transverse section of the second inner cylindrical portion is larger than a maximum dimension of an outer shape of a transverse section of the first inner cylindrical portion, and a minimum dimension of an outer shape of a transverse section of the second inner cylindrical portion is smaller than the minimum dimension of the outer shape of the transverse section of the first cylindrical portion.

19. The guide wire according to claim 17, wherein the inner cylindrical body includes a first inner cylindrical portion and a second inner cylindrical portion located on a proximal end side of the inner cylindrical body with respect to the first inner cylindrical portion, and the second inner cylindrical portion of the inner cylindrical body and the core shaft are in contact.

20. The guide wire according to claim 17,
wherein the inner cylindrical body includes a first inner cylindrical portion and a second inner cylindrical portion located on a proximal end side of the inner cylindrical body with respect to the first inner cylindrical portion, and the second cylindrical portion of the cylindrical body and the second inner cylindrical portion of the inner cylindrical body are in contact.

* * * * *